United States Patent Office 2,707,686
Patented May 3, 1955

2,707,686

PRODUCTION OF MOULDING POWDERS FROM SHELLAC AND BHILAWAN RESINS

Salimuzzaman Siddiqui, New Delhi, and Krishen Kumar Sarin and Jyoti Prasad Varma, Poona, India, assignors to Council of Scientific and Industrial Research, New Delhi, India No Drawing. Application May 1, 1950,
Serial No. 159,383

4 Claims. (Cl. 106—200)

The invention relates to the production of moulding powders from shellac and bhilawan resins, which when moulded into different articles have improved properties.

Bhilawan shell liquid or bhilawan resin is a darkish, resinous liquid occurring in the honeycomb structure of the pericarp of the nuts, which consists of about 50 to 70% of bhilawanol and 50 to 30% of polymerised product, the proportion mainly depending upon the age and conditions of storage of the nuts. The shell liquid can be obtained by any of the following processes:

(1) Extraction of the incised or lightly crushed nuts with lower boiling organic solvents, preferably petroleum ether.

(2) Pressing out the nuts, preferably under heat in a hydraulic press or in a rotary crusher.

(3) Heat expulsion of the liquid by roasting the nuts, preferably at 200 to 400° C., in retorts fitted with a lower outlet for draining out the shell liquid into the receiver system.

(4) Expulsion of the liquid by exposing the nuts to superheated steam at temperatures ranging from 200 to 280° C. as described in the Indian Patents Nos. 32,237 and 34,873.

While in the above processes 1, 2 and 4 the shell liquid is obtained in the form in which it occurs in the nuts, in the process of dry heat expulsion (3), it is subjected to a partial thermal degradation and polymerisation, yielding a more viscous liquid from which hardly any "bhilawanol" as such can be obtained. It is this material, however, which on account of the comparatively easy and less costly procedure forms the actual commercial product in India at present. Shell liquid obtained by any of the processes referred to above will, however, work suitably for the purposes of the present invention.

It is known that bhilawan shell liquid with or without modification with other resins or resinols can be converted to a resin for the manufacture of coating compositions, plastic compositions or like materials.

We have now found the following process for making moulding powders from the aforesaid resin together with shellac.

The process according to this invention consists in preparing moulding powders by the impregnation of fibrous filler particles (such as sawdust or wood flour) with an alkaline solution of shellac followed by precipitation of the shellac on the filler particles with dilute acid, incorporation of bhilawan resin in the dried material by blending on hot rolls and then powdering to desired mesh.

The filler particles are impregnated by mixing with alkaline solution of shellac, which shellac is subsequently precipitated on the filler particles with dilute acids. Excess acid is washed out so as to keep the shellac treated filler particles slightly on the acidic side and the treated filler is dried prior to incorporation of the bhilawan resin. A preferred mode of adjusting the acidity consists in washing with water the mass obtained on precipitation of shellac till the pH of the wash water ranges from 6–7.

Normally, shellac is known to be used for coating, impregnation and binding purposes in alcoholic solutions. The use of the costly solvent is avoided in this process. The process, moreover, can utilize the cheap inferior grades of lac for the production of moulding powders.

According to a mode of carrying out the invention, sawdust, wood flour or other fillers, are impregnated with an ammoniacal solution of shellac, which is subsequently precipitated on the filler particles with dilute hydrochloric acid; the resulting resin-treated filler is washed with water till the pH of the wash water ranges from 6–7, dried and subsequently worked with the bhilawan resin on hot rollers at a temperature range of 110°–120° C. The residual ammonium chloride formed during the precipitation, incidentally acts as an accelerator. The moulding powders thus produced have better moulding qualities and give articles possessing better strength properties and electrical and water resistance than those prepared from shellac or bhilawan resins separately. The flexural and tensile strength of boards prepared with these moulding powders are: 4500 lbs. per square inch and 3500 lbs. per square inch respectively as against 2500 lbs. per square inch and 3000 lbs. per square inch of shellac. The corresponding figures for the water resistance of the boards are 4.0% and 15% (proportion of binding material being 20% in the above cases).

Example I

Shellac or lac (available in any form) is dissolved in aqueous ammonia under heat and to this solution is added 50–90% by weight of sawdust, wood flour or other inert filler. The product, which therefore contains from 10 to 50% of shellac, is mixed intimately by constant stirring till a thorough impregnation of the material has taken place. The impregnated material is then treated with dilute hydrochloric acid when shellac becomes deposited on the filler particles. The resulting resin-treated filler is thoroughly washed with water till the pH of the wash water ranges from 6–7 and thereafter dried at 105°–110° C. The dried material is then worked with bhilawan resin, lubricants such as aluminium stearate, additional water repellent materials such as calcium stearate (and pigments, if desired) on hot rollers at a temperature range of 110°–120° C. till a well-blended sheet is obtained. The sheet thus obtained becomes brittle on cooling and is first ground in a disintegrator and then in a ball mill. The resulting powder is sieved to the desired mesh and moulded in a press under the following conditions.

1. Moulding temperature_____ 140–160° C.
2. Moulding pressure_____ ⅓–1½ tons per square inch.
3. Moulding time_____ 3–6 minutes.

Articles produced from this powder have better water resistance, tensile strength and flexural strength than those obtained from shellac or any other hitherto reported modified shellac moulding compositions. They have also better electrical properties and are superior in shock resistance.

Example II 34 parts by weight of flake shellac (34% based on the mixture) were soaked in 170 parts of water and 3 parts of dilute ammonia (1:4). After about half an hour the product was heated with constant stirring till the whole of shellac got dissolved. To this was added 57 parts by weight of sawdust and 3 parts of cotton waste, and the whole mass was well mixed in the course of about an hour to ensure complete impregnation. The impregnated material was then treated with 1% dilute hydrochloric acid to effect the deposition of shellac on the filler particles. The resulting material was thoroughly washed with water till the pH of wash water ranged from 6–7. It was then dried at 105–110° C. and worked with 6 parts by weight of bhilawan resin (6% based on the mixture) and 1 part by weight of aluminium stearate on hot rollers at a temperature range of 110–120° C., till a well blended sheet was obtained. This sheet was ground first in fan type disintegrator and then in a ball mill and the resulting powder sieved to 100 mesh. The powder thus obtained was moulded under the following conditions:

Temperature of pressing _____ 150–160° C.
Pressure _____ ½ ton per square inch.
Time of pressing _____ 3 minutes.

The properties of the moulded articles, which were taken out of the mould after cooling under pressure to 100° C. were as under:

1. Flow and finish _____ Excellent.
2. Specific gravity 150/150° _____ 1.322.
3. Tensile strength _____ 3000–3500 lbs. per square inch.
4. Flexural strength _____ 4000–4500 lbs. per square inch.
5. Water absorption _____ 4.0%.
6. Machining qualities _____ Good.

We claim:

1. A molding powder comprising a hot-blended mixture of comminuted wood fibers, shellac precipitated on the wood fibers, and bhilawan resin, the shellac and bhilawan resin together constituting about 20% of the product and being present in the relative proportions of from about 34 parts of shellac to 6 parts of bhilawan resin.

2. In the manufacture of molding powders, the process which comprises dissolving about 34 parts by weight of shellac in a dilute aqueous solution of ammonia, mixing this solution with about 60 parts of a finely-divided inert fibrous filler, adding sufficient dilute acid to precipitate the shellac on the fibrous filler, washing to remove the acid and until the pH of the wash water has a pH of from about 6 to 7, drying, blending with about 6 parts by weight of bhilawan resin on heated rolls and comminuting to form a molding powder.

3. In the manufacture of molding powders, the process which comprises dissolving about 34 parts by weight of shellac in a dilute aqueous solution of ammonia, mixing this solution with about 60 parts of comminuted wood filler, adding sufficient dilute hydrochloric acid to precipitate the shellac on the wood fiber and to form ammonium chloride, washing until the pH of the wash water has a pH of from about 6 to 7, drying, blending with about 6 parts of bhilawan resin with aluminum stearate as a lubricant and with calcium stearate as a water repellant on rolls heated to a temperature of from about 110° to 120° C. until a well blended sheet is obtained, then comminuting and grinding said sheet to produce a molding powder.

4. A molding powder comprising a wood flour filler having from about 10 to 50% of shellac precipitated on the wood fibers and impregnated with about 6% of bhilawan resin, the molding powder containing small amounts of aluminum stearate as a lubricant, calcium stearate as a water repellant and ammonium chloride as an accelerator.

References Cited in the file of this patent

UNITED STATES PATENTS

| | | |
|---|---|---|
| 1,227,465 | McCoy | May 22, 1917 |
| 1,265,855 | Wood | May 14, 1918 |
| 1,299,922 | Dunbar | Apr. 8, 1919 |
| 1,428,273 | Collings | Sept. 5, 1922 |
| 1,886,120 | Rafton | Nov. 1, 1932 |
| 2,386,421 | Basford | Oct. 9, 1945 |

FOREIGN PATENTS

| | | |
|---|---|---|
| 417 | Great Britain | of 1887 |
| 5,840 | Great Britain | of 1883 |
| 15,988 | Great Britain | of 1915 |
| 213,016 | Great Britain | Mar. 27, 1924 |
| 29,051 | India | Mar. 22, 1943 |

OTHER REFERENCES

Sen et al's "Practical Applications of Recent Lac Research," Orient Longmans Ltd., India (1948), pages 32–36.

Siddiqui: "Industrial Utilisation of Bhilawan," Journal of Scientific and Industrial Research, vol. No. 1, pages 19–25.